(12) United States Patent
Niu

(10) Patent No.: US 10,953,537 B2
(45) Date of Patent: *Mar. 23, 2021

(54) ROBOT

(71) Applicant: Seiko Epson Corporation, Tokyo (JP)

(72) Inventor: Akio Niu, Matsumoto (JP)

(73) Assignee: Seiko Epson Corporation

( * ) Notice: Subject to any disclaimer, the term of this patent is extended or adjusted under 35 U.S.C. 154(b) by 117 days.

This patent is subject to a terminal disclaimer.

(21) Appl. No.: 16/143,674

(22) Filed: Sep. 27, 2018

(65) Prior Publication Data

US 2019/0099881 A1 Apr. 4, 2019

(30) Foreign Application Priority Data

Sep. 29, 2017 (JP) .............................. JP2017-192075

(51) Int. Cl.
| B25J 9/06 | (2006.01) |
| B25J 19/00 | (2006.01) |
| B25J 9/00 | (2006.01) |
| B25J 9/10 | (2006.01) |
| B25J 9/12 | (2006.01) |

(52) U.S. Cl.
CPC .............. *B25J 9/06* (2013.01); *B25J 9/0009* (2013.01); *B25J 9/104* (2013.01); *B25J 9/12* (2013.01); *B25J 19/0054* (2013.01)

(58) Field of Classification Search
CPC ........ B25J 9/06; B25J 19/0054; B25J 9/0009; B25J 9/104; B25J 9/12; B25J 18/00
USPC ......................................... 74/490.01–490.07
See application file for complete search history.

(56) References Cited

U.S. PATENT DOCUMENTS

| 6,408,710 B1 | 6/2002 | Kullborg et al. | |
| 9,647,513 B2* | 5/2017 | Park | H02K 7/116 |
| 2002/0014874 A1 | 2/2002 | Hietmann et al. | |
| 2016/0089775 A1* | 3/2016 | Yamazaki | B25J 9/0087 |
| | | | 318/568.11 |
| 2016/0089797 A1* | 3/2016 | Kawase | B25J 19/005 |
| | | | 74/490.02 |
| 2019/0099883 A1* | 4/2019 | Niu | B25J 9/0009 |

(Continued)

FOREIGN PATENT DOCUMENTS

| EP | 2979822 A2 | 2/2016 |
| JP | 11-300681 A | 11/1999 |
| JP | 2011-177845 A | 9/2011 |

(Continued)

OTHER PUBLICATIONS

Extended European Search Report for Patent Application No. EP 18197157.3 dated Feb. 21, 2019 (8 pages).

*Primary Examiner* — Victor L MacArthur
(74) *Attorney, Agent, or Firm* — Harness, Dickey & Pierce, P.L.C.

(57) ABSTRACT

A robot includes a base, a robot arm including a first arm provided on the base and rotating around a first rotation axis, a first motor provided in the first arm and configured to rotate the first arm, a control board provided on an inside of the base and configured to control driving of the robot arm, and a power supply board provided on the inside of the base and configured to supply electric power to the control board. The robot includes a first driving board configured to drive the first motor on the basis of a command of the control board. The first driving board is provided in the first arm.

8 Claims, 13 Drawing Sheets

(56) References Cited

U.S. PATENT DOCUMENTS

2019/0099901 A1* 4/2019 Niu ..................... B25J 9/126

FOREIGN PATENT DOCUMENTS

| | | | |
|---|---|---|---|
| JP | 2015136780 A | * | 1/2014 |
| JP | 2014-240099 A | | 12/2014 |
| WO | WO-99-15319 A1 | | 4/1999 |

* cited by examiner

ROBOT

BACKGROUND

1. Technical Field

The present invention relates to a robot.

2. Related Art

There is known a robot including a base and a robot arm including a plurality of arms (links). One arm of adjacent two arms of the robot arm is rotatably coupled to the other arm via a joint section. An arm on the most distal end side (the most upstream side) is rotatably coupled to the base via a joint section. The joint sections are driven by motors. The arms rotate according to the driving of the joint sections. For example, a hand is detachably attached to an arm on the most distal end side (the most downstream side) as an end effector. For example, the robot grasps an object with the hand, moves the object to a predetermined place, and performs predetermined work such as assembly.

JP-A-2011-177845 (Patent Literature 1) discloses a SCARA robot. In the robot disclosed in Patent Literature 1, the robot and a robot controller including a control board for controlling driving of the robot are configured as separate bodies.

In the robot disclosed in Patent Literature 1, because the robot and the robot controller are configured as the separate bodies, the robot (a robot system) is increased in size.

SUMMARY

An advantage of some aspects of the invention is to solve at least a part of the problems described above, and the invention can be implemented as the following forms or application examples.

A robot according to an aspect of the invention includes: a base; a robot arm provided on the base; a control board provided on an inside of the base and configured to control driving of the robot arm; and a power supply board provided on the inside of the base and configured to supply electric power to the control board. The robot arm includes a first arm provided on the base rotatably around a first rotation axis. A first motor configured to rotate the first arm is provided in the first arm.

With such a robot according to the aspect of the invention, because the robot and the control board and the power supply board (a control device) are integrated, a reduction in the size of the robot can be achieved.

Because the first motor is provided in the first arm rather than on the inside of the base, maintenance and the like of the first motor can be easily and quickly performed. Compared with when the first motor, which is a heat source, is provided on the inside of the base, the temperature on the inside of the base can be reduced. Consequently, influence by the heat of the control board can be reduced.

In the robot according to the aspect of the invention, it is preferable that the robot further includes a first driving board configured to drive the first motor on the basis of a command of the control board, and the first driving board is provided in the first arm.

With this configuration, compared with when the first driving board, which is a heat source, is provided on the inside of the base, the temperature on the inside of the base can be reduced. Accordingly, the influence by the heat of the control board can be reduced.

In the robot according to the aspect of the invention, it is preferable that a voltage supplied to the first motor is 1 V or more and 100 V or less.

With this configuration, the first motor and the power supply board can be reduced in size. Accordingly, a reduction in the size of the robot can be achieved.

In the robot according to the aspect of the invention, it is preferable that the robot further includes a belt configured to transmit a driving force of the first motor.

With this configuration, the first motor can be disposed in a position separated from a joint that couples the base and the first arm. Accordingly, the first motor can be disposed in a desired position of the first arm.

In the robot according to the aspect of the invention, it is preferable that the first motor does not overlap the first rotation axis when viewed from an axial direction of the first rotation axis.

With this configuration, because the first motor is separated from the base, heat generated in the first motor is less easily transmitted to the control board.

In the robot according to the aspect of the invention, it is preferable that the robot arm includes a second arm provided on the first arm rotatably around a second rotation axis, and a second motor configured to rotate the second arm is provided in the second arm.

With this configuration, the first motor and the second motor, which are heat sources, are distributed to the first arm and the second arm. Compared with when the first motor and the second motor are not distributed, the temperatures of the first arm and the second arm can be reduced.

In the robot according to the aspect of the invention, it is preferable that the robot further includes a second driving board configured to drive the second motor on the basis of a command of the control board, and the second driving board is provided in the second arm.

With this configuration, the first driving board and the second driving board, which are heat sources, are distributed to the first arm and the second arm. Compared with when the first driving board and the second driving board are not distributed, the temperatures of the first arm and the second arm can be reduced.

In the robot according to the aspect of the invention, it is preferable that a fan is not provided on the base.

With this configuration, the number of components can be reduced. The configuration of the base can be simplified. The base can be reduced in size. Accordingly, a reduction in the size of the robot can be achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

A robot according to an embodiment of the invention is explained in detail below with reference to the accompanying drawings.

Embodiment

Figure 1:
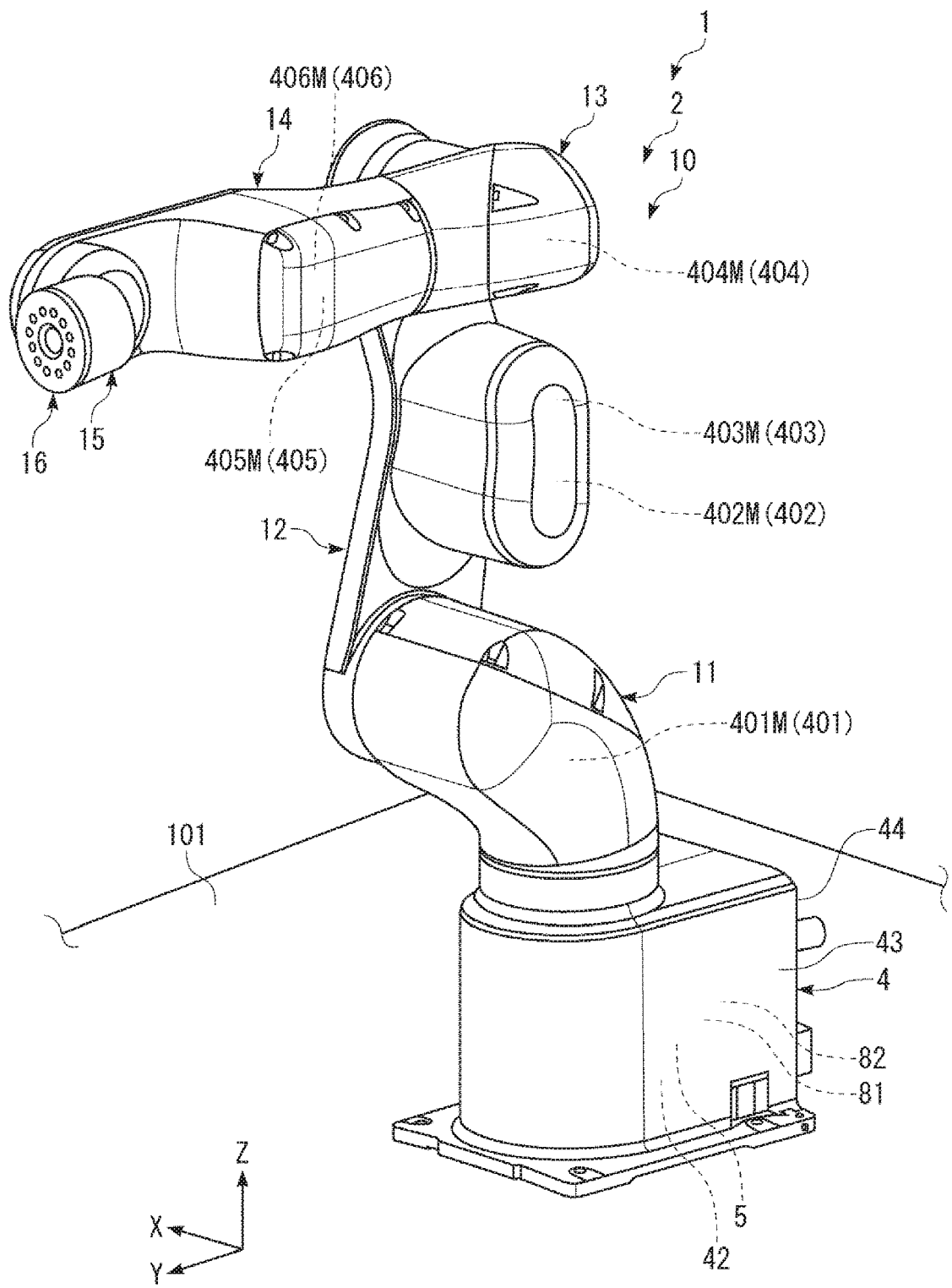
FIG. 1 is a perspective view showing a robot according to an embodiment of the invention.
Figure 2:
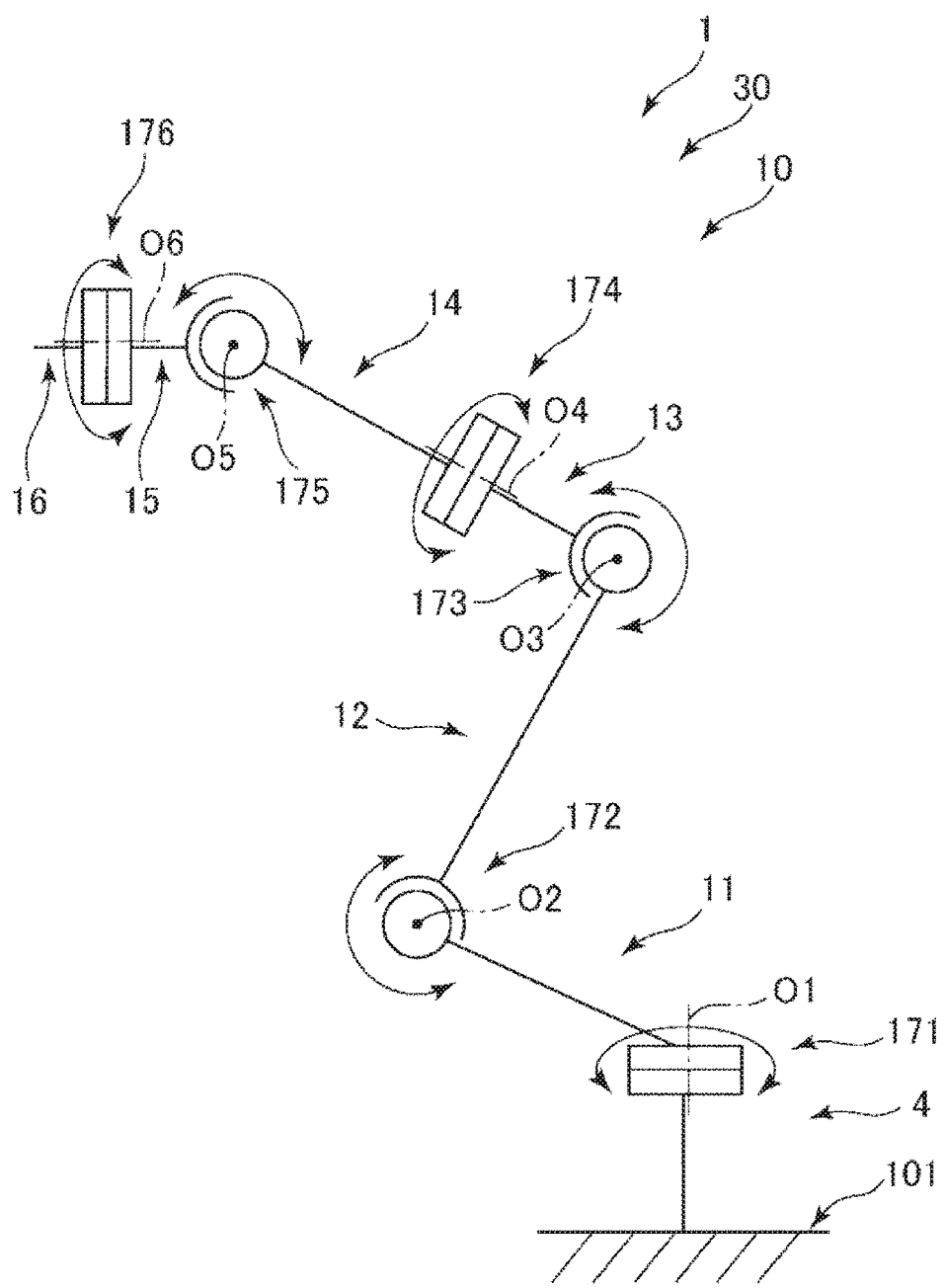
FIG. 2 is a schematic diagram of the robot shown in FIG. 1.
Figure 3:
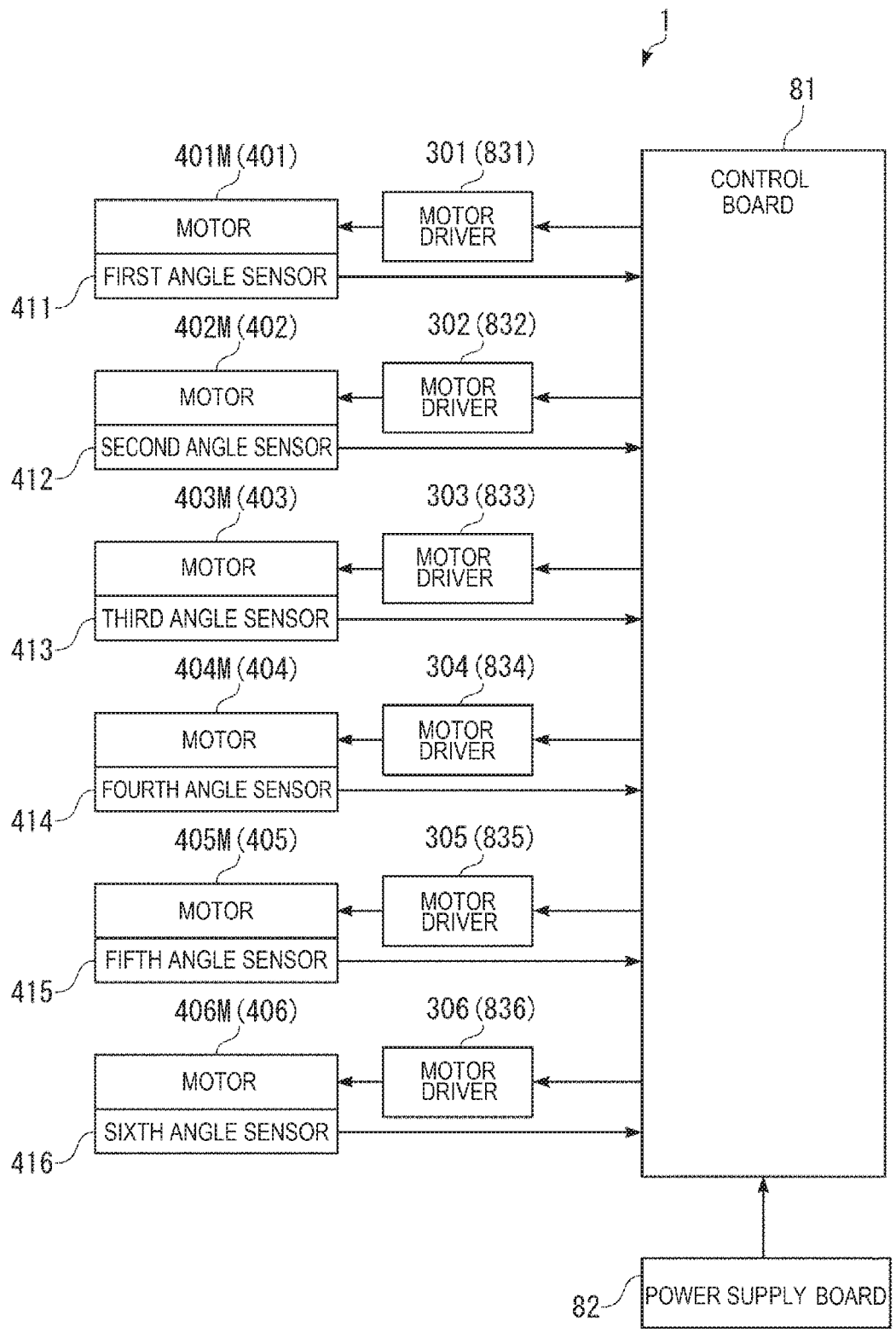
FIG. 3 is a block diagram showing a main part of the robot shown in FIG. 1.
Figure 4:
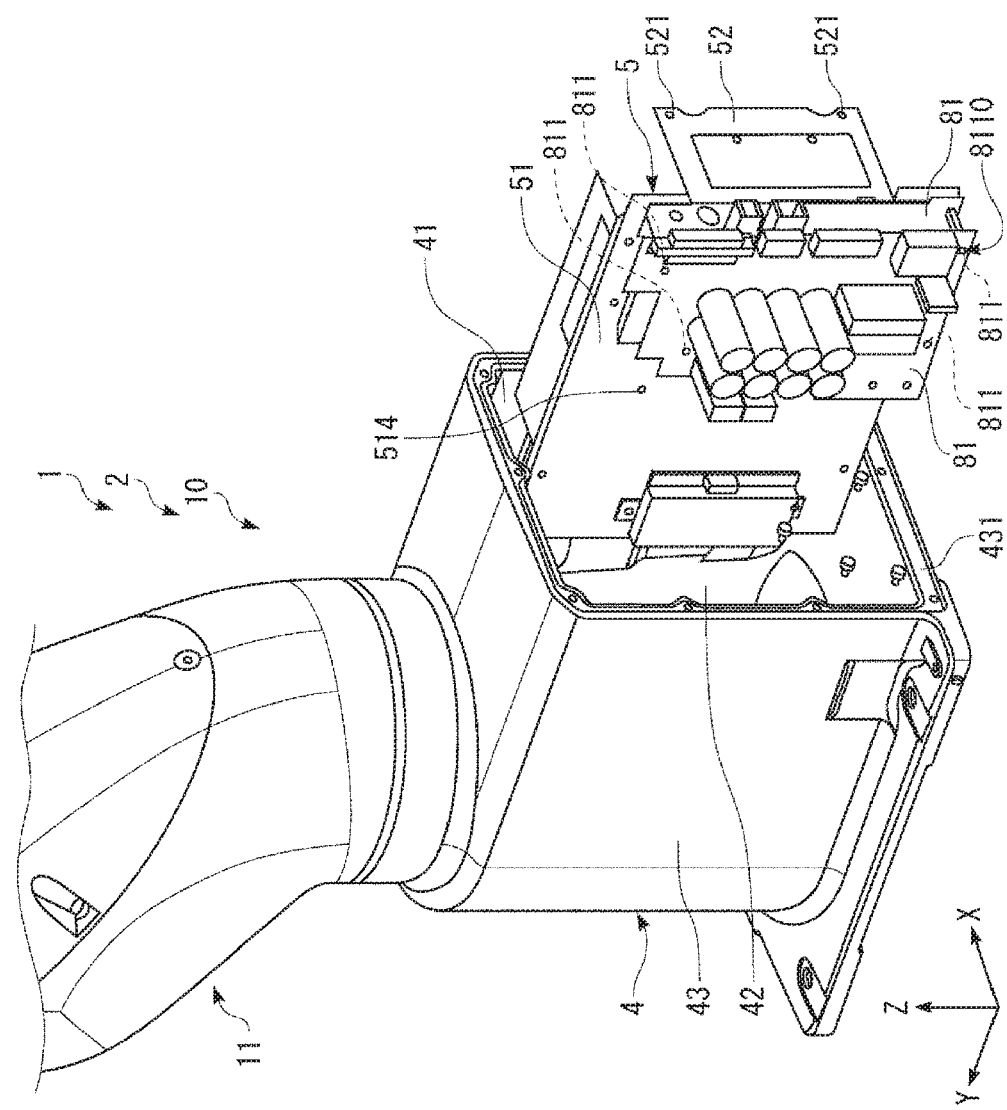
FIG. 4 is a perspective view showing a base and a first arm of the robot shown in FIG. 1.
Figure 5:
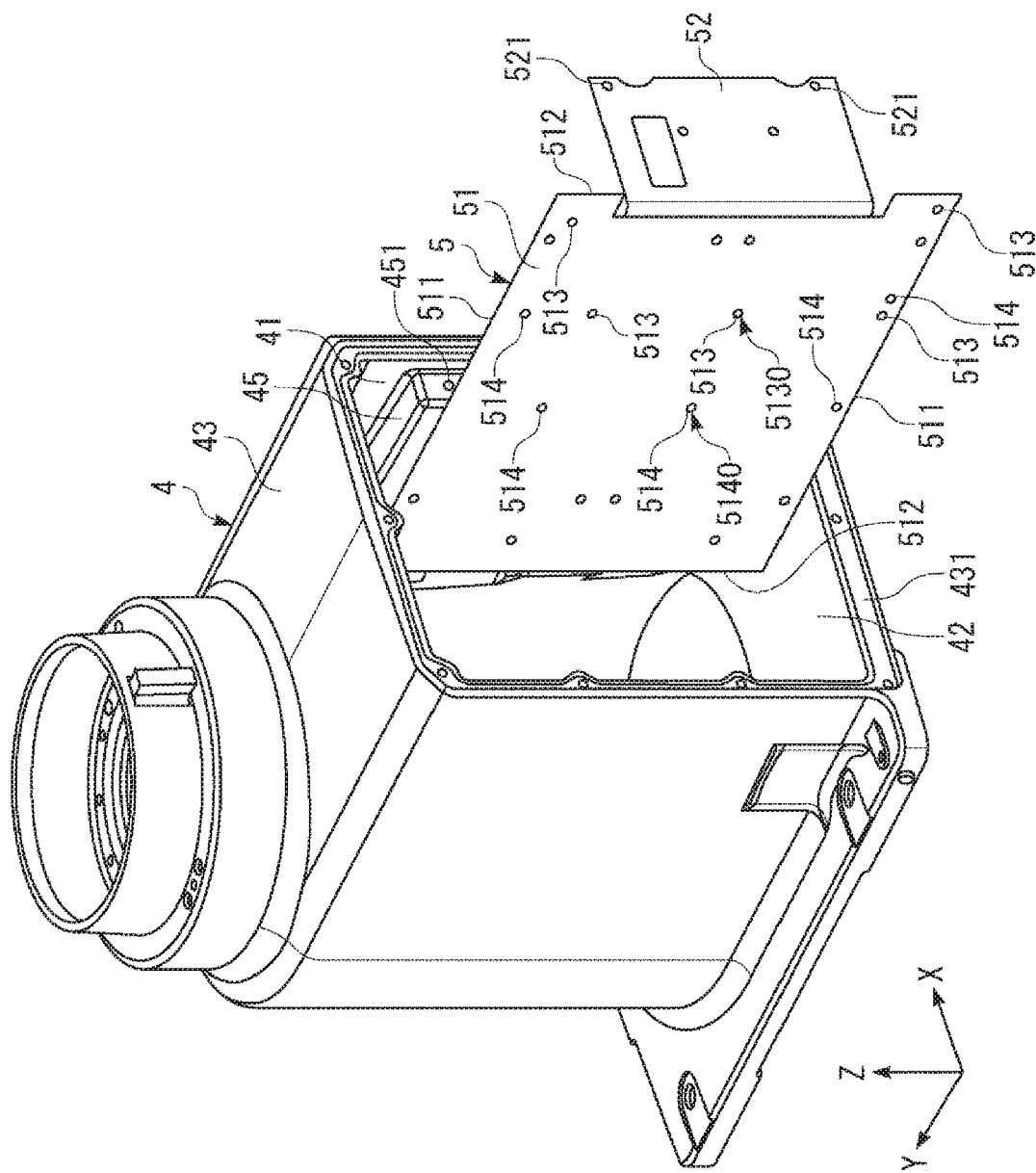
FIG. 5 is a perspective view showing the base of the robot shown in FIG. 1.
Figure 6:
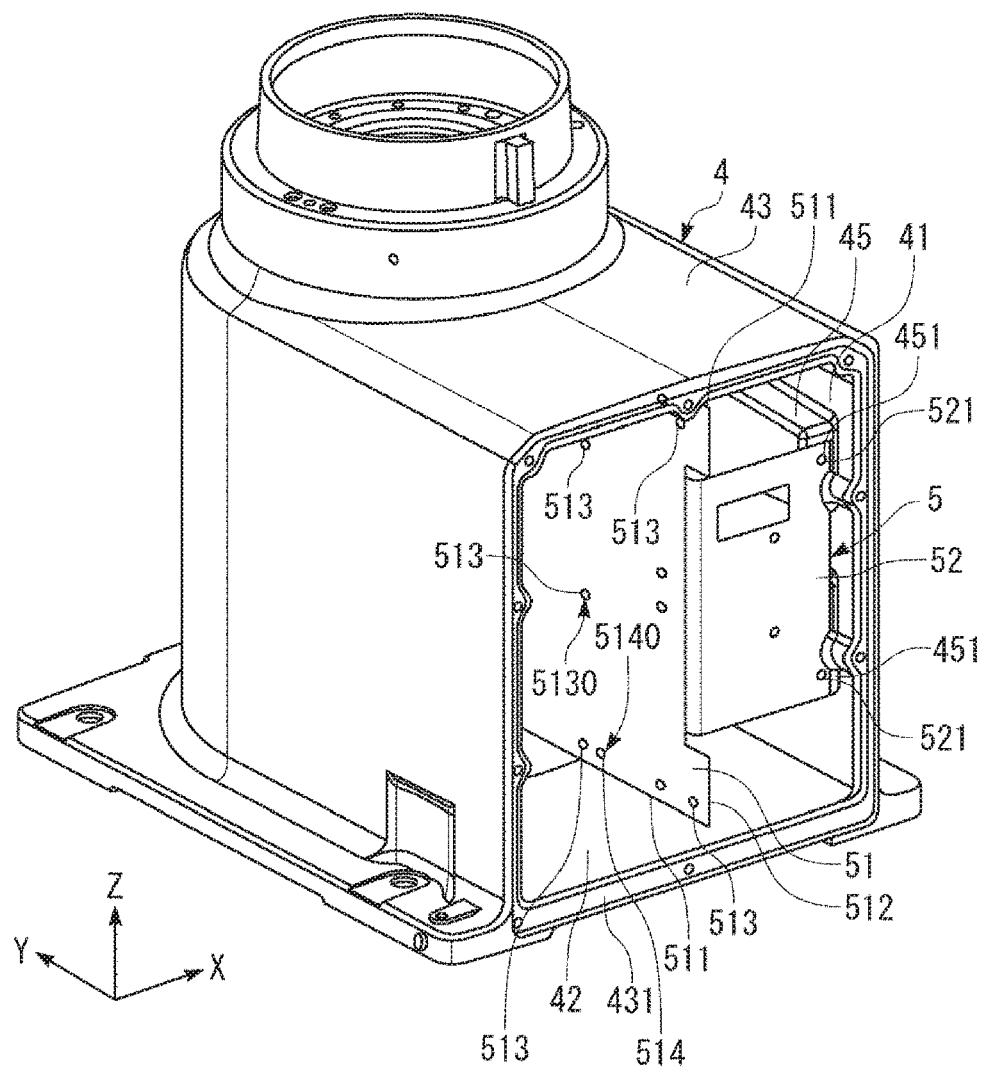
FIG. 6 is a perspective view showing the base of the robot shown in FIG. 1.
Figure 7:
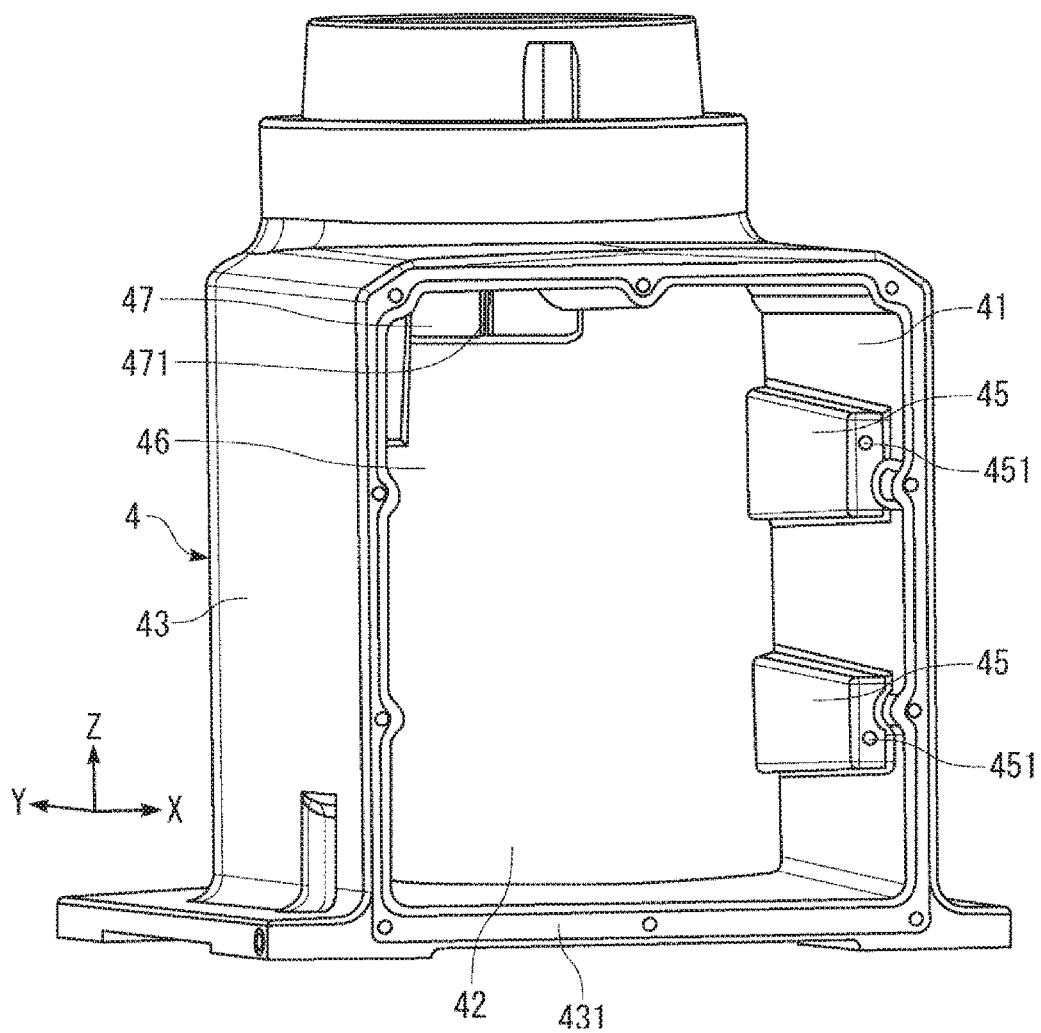
FIG. 7 is a perspective view showing the base of the robot shown in FIG. 1.
Figure 8:
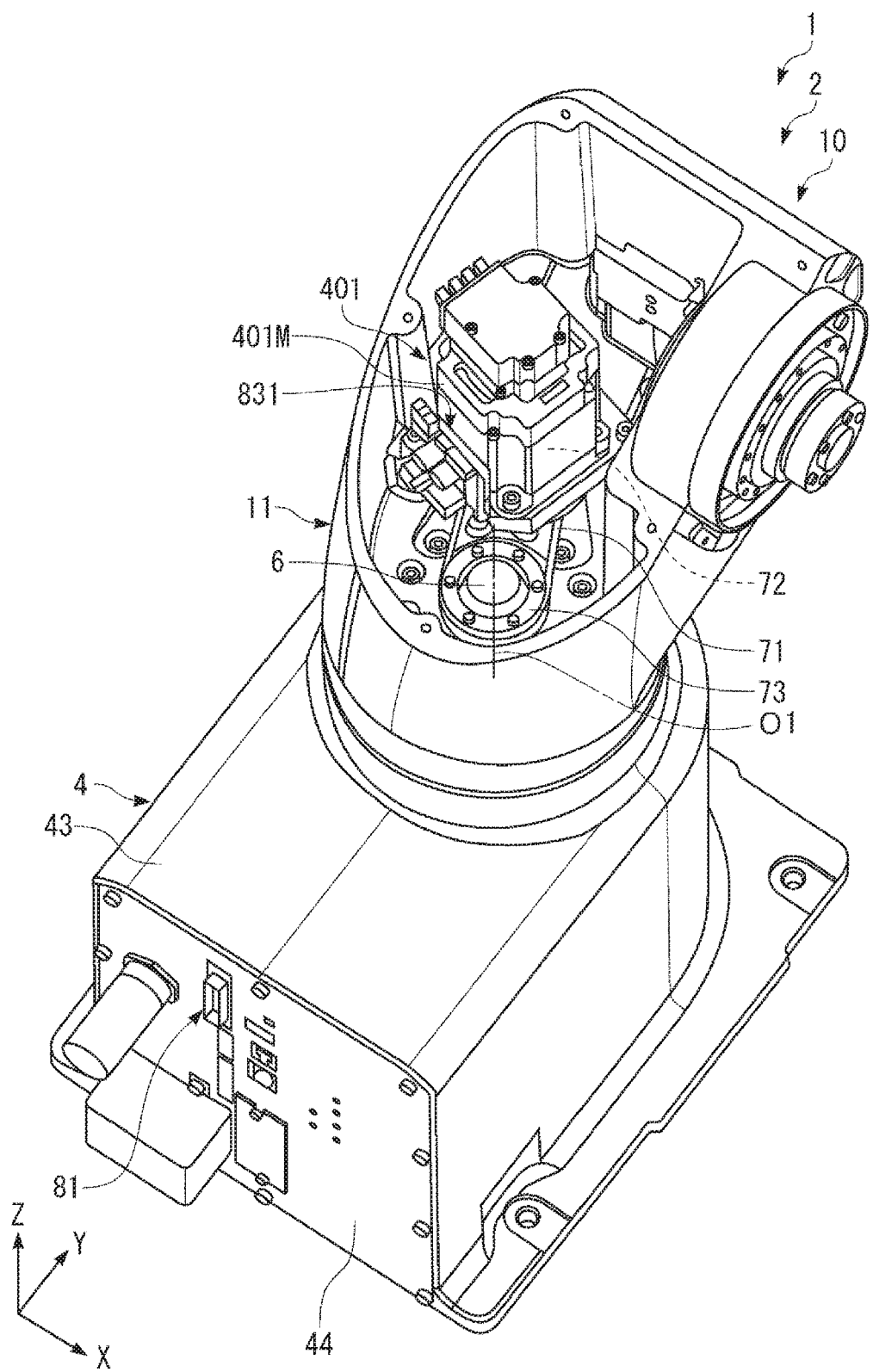
FIG. 8 is a perspective view showing the base and the first arm of the robot shown in FIG. 1.
Figure 9:
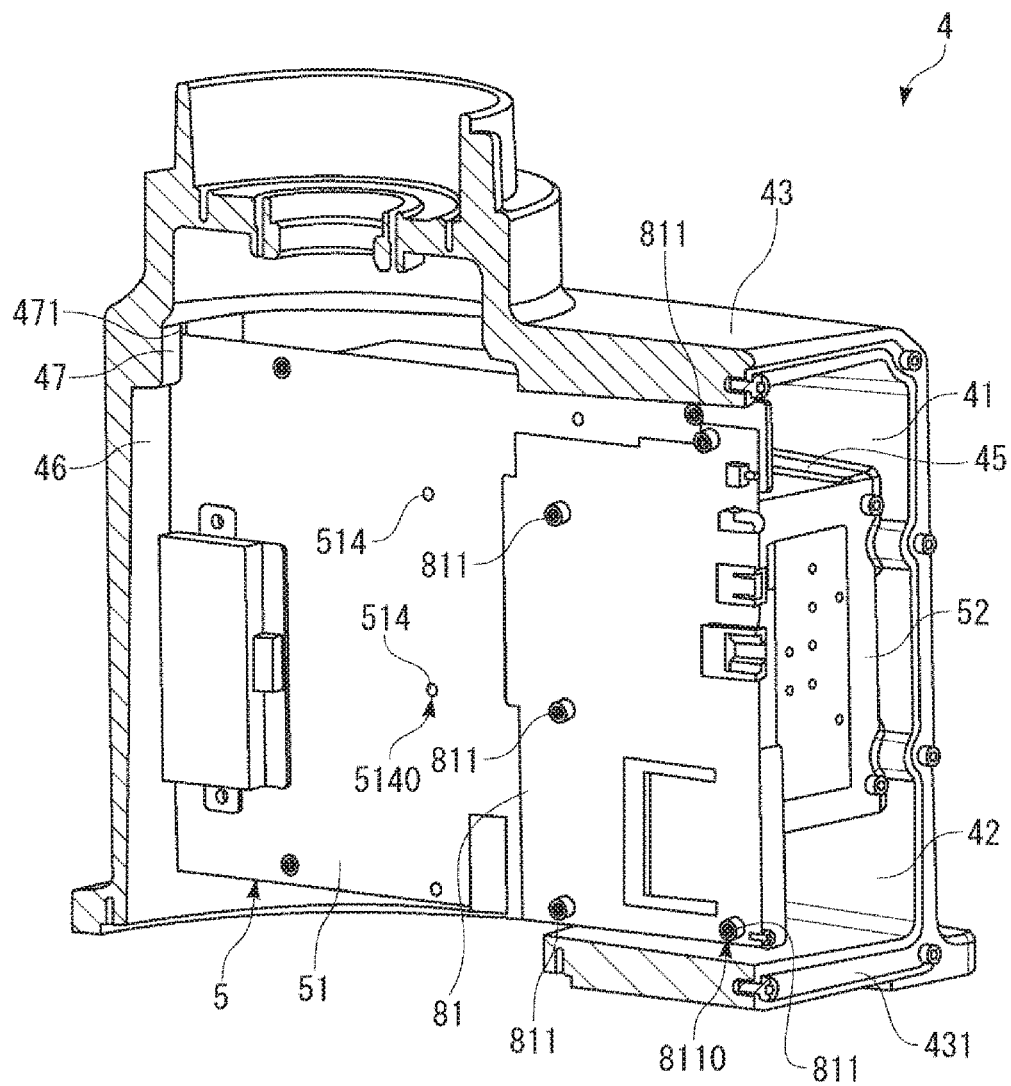
FIG. 9 is a sectional view showing the base of the robot shown in FIG. 1.
Figure 10:
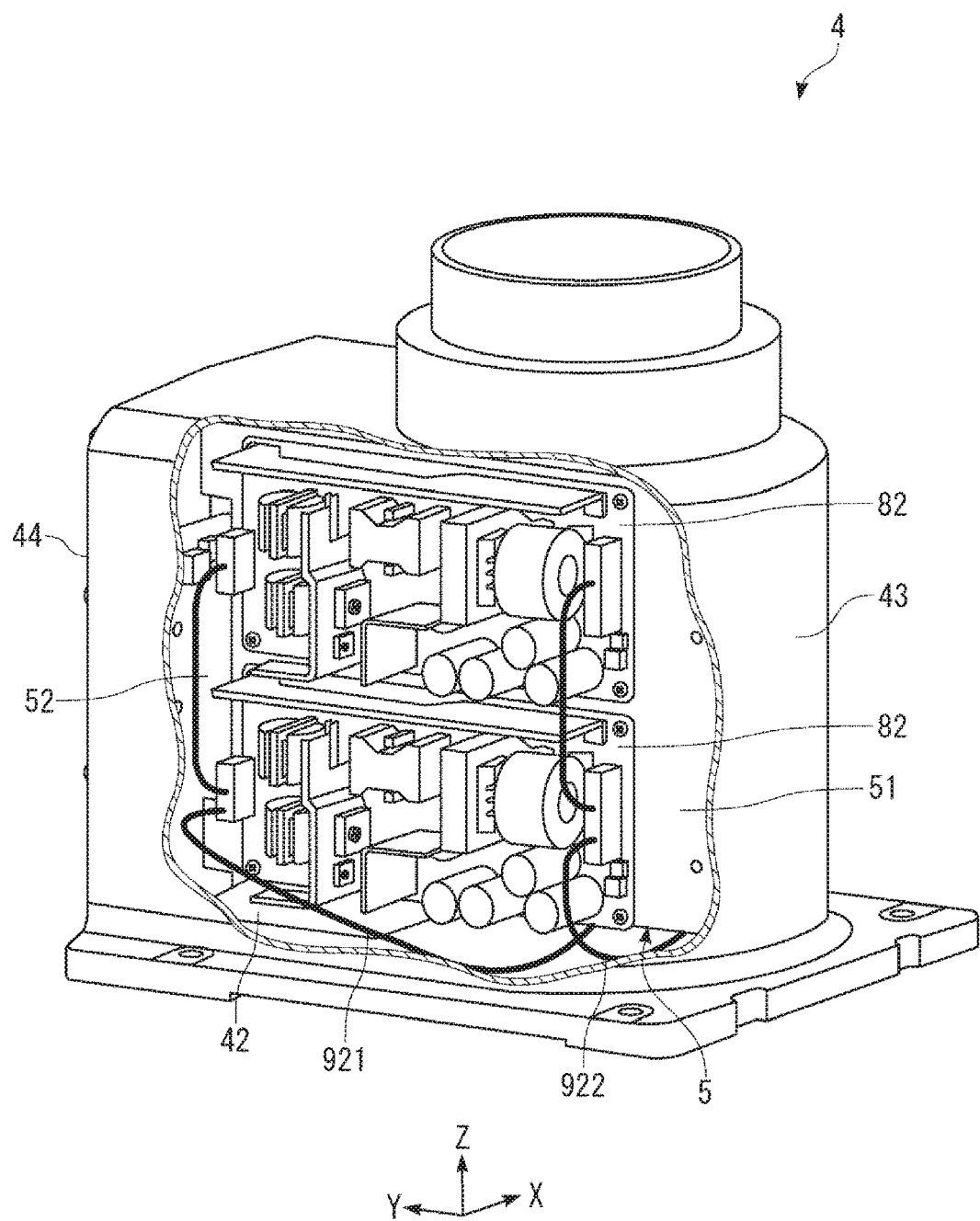
FIG. 10 is a cutaway view obtained by cutting away a part of the base of the robot shown in FIG. 1.
Figure 11:
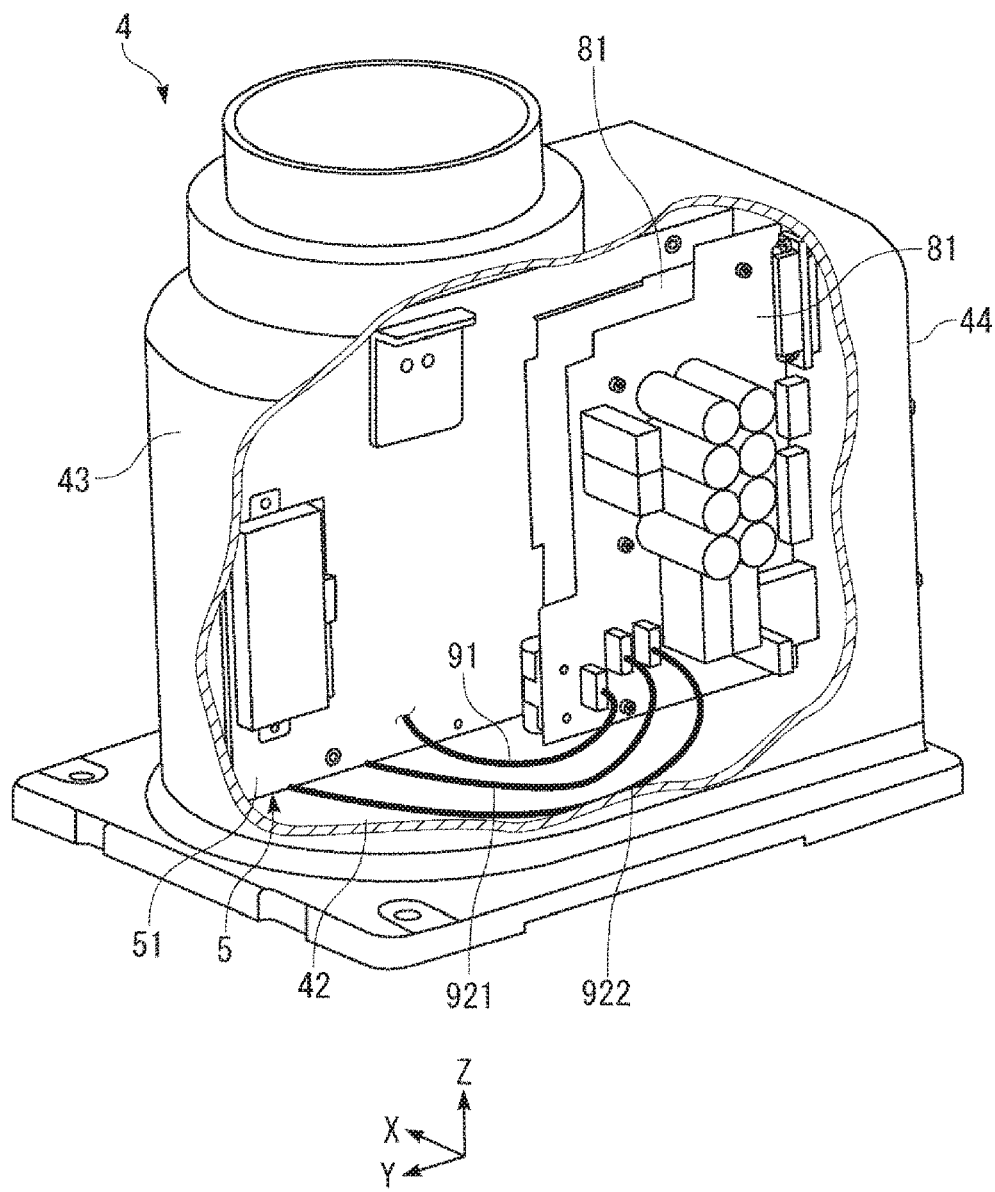
FIG. 11 is a cutaway view obtained by cutting away a part of the base of the robot shown in FIG. 1.
Figure 12:
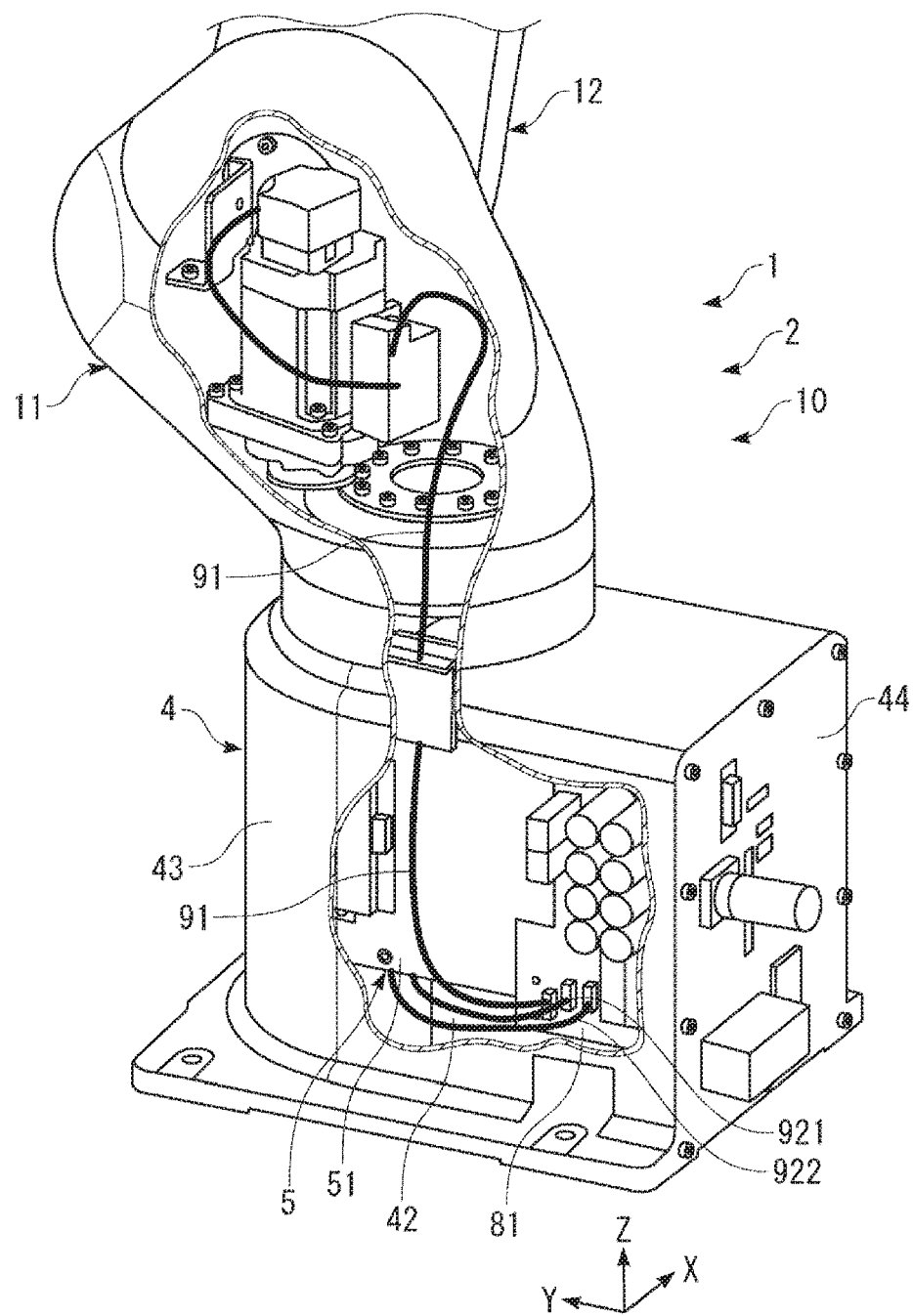
FIG. 12 is a cutaway view obtained by cutting away a part of the base and the first arm of the robot shown in FIG. 1.
Figure 13:
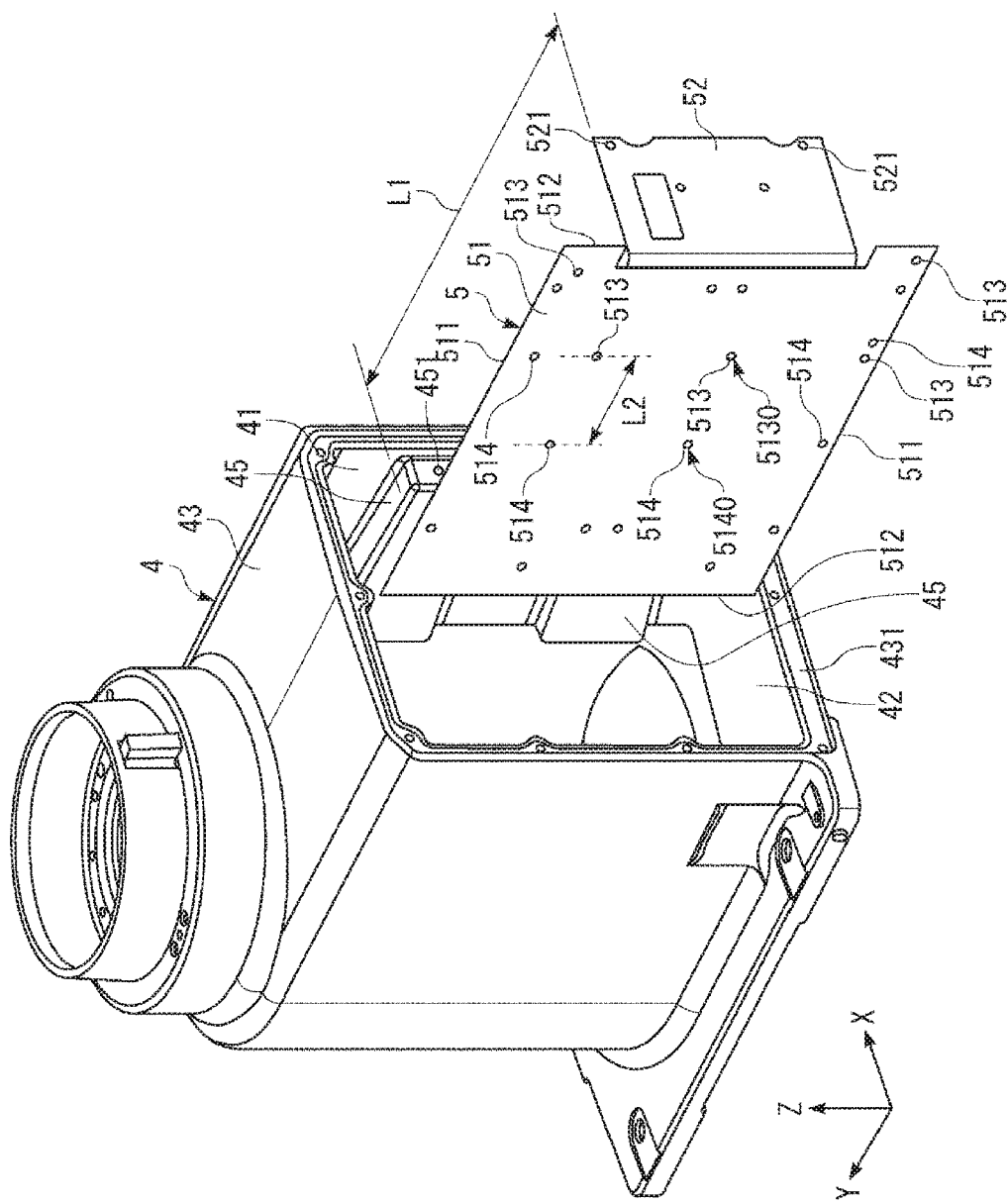
FIG. 13 is a perspective view showing the base of the robot shown in FIG. 1.

FIG. 1 is a perspective view showing a robot according to an embodiment of the invention. FIG. 2 is a schematic diagram of the robot shown in FIG. 1. FIG. 3 is a block diagram showing a main part of the robot shown in FIG. 1. FIG. 4 is a perspective view showing a base and a first arm of the robot shown in FIG. 1. FIG. 5 is a perspective view showing the base of the robot shown in FIG. 1. FIG. 6 is a perspective view showing the base of the robot shown in FIG. 1. FIG. 7 is a perspective view showing the base of the robot shown in FIG. 1. FIG. 8 is a perspective view showing the base and the first arm of the robot shown in FIG. 1. FIG. 9 is a sectional view showing the base of the robot shown in FIG. 1. FIG. 10 is a cutaway view obtained by cutting away a part of the base of the robot shown in FIG. 1. FIG. 11 is a cutaway view obtained by cutting away a part of the base of the robot shown in FIG. 1. FIG. 12 is a cutaway view obtained by cutting away a part of the base and the first arm of the robot shown in FIG. 1. FIG. 13 is a perspective view showing the base of the robot shown in FIG. 1. Note that, in FIG. 3, one of two control boards is representatively illustrated and one of two power supply boards is representatively illustrated.

In the following explanation, for convenience of explanation, the upper side in FIGS. 1 and 2 is referred to "upper" or "upward" and the lower side in FIGS. 1 and 2 is referred to as "lower" or "downward". The base side in FIGS. 1 and 2 is referred to as "proximal end" or "upstream" and the opposite side of the base side is referred to as "distal end" or "downstream". The up-down direction in FIGS. 1 and 2 is the vertical direction.

As shown in FIG. 1, as three axes orthogonal to one another, an X axis, a Y axis, and a Z axis are shown. The distal end side of arrows indicating the axes is referred to as "+ (positive)" and the proximal end side of the arrows is referred to as "− (negative)". The Z-axis direction is referred to as "vertical direction". An X-Y plane including the X axis and the Y axis is referred to as "horizontal plane". A direction in the X-Y plane (a direction along the X-Y plane) is referred to as "horizontal direction". A direction parallel to the X axis is referred to as "X direction (X-axis direction)" as well. A direction parallel to the Y axis is referred to as "Y direction (Y-axis direction)" as well. A direction parallel to the Z axis is referred to as "Z direction (Z-axis direction)" as well.

In this specification, "horizontal" is not limited to complete horizontality and includes inclination at an angle of ±5° or less with respect to the horizontality. Similarly, in this specification, "vertical" is not limited to complete verticality and includes inclination at an angle of ±5° or less with respect to the verticality. In this specification, "parallel" is not limited to complete parallelism of two lines (including axes) or surfaces and includes inclination at an angle of ±5° or less of the two lines or surfaces. In this specification "orthogonal" is not limited to complete orthogonality of two lines (including axes) or surfaces and includes inclination at an angle of ±5° or less of the two lines or surfaces.

A robot 1 shown in FIG. 1 can be used in kinds of work such as conveyance, assembly, and inspection of various kinds of work (objects).

As shown in FIGS. 1 to 3, the robot 1 includes a robot body 2 including a base 4 and a robot arm 10 displaceably coupled to (provided on) the base 4, a first driving source 401, a second driving source 402, a third driving source 403, a fourth driving source 404, a fifth driving source 405, and a sixth driving source 406, a control board 81, a power supply board 82, and driving boards 831, 832, 833, 834, 835, and 836.

The robot arm 10 includes a first arm 11, a second arm 12, a third arm 13, a fourth arm 14, a fifth arm 15, and a sixth arm 16. A wrist is configured by the fifth arm 15 and the sixth arm 16. An end effector (not shown in FIGS. 1 to 3) such as a hand can be detachably attached (connected) to the distal end of the sixth arm 16. An object (not shown in FIGS. 1 to 3) can be grasped (held) by the end effector. The object grasped (held) by the end effector is not particularly limited. Examples of the object include various objects such as an electronic component and an electronic device.

The end effector is not particularly limited if the end effector is capable of holding the object. Examples of the end effector include a hand capable of grasping (grabbing) the object and a suction head (a suction hand) that sucks to hold the object.

Note that a not-shown force detecting section (force detecting device) may be provided between the sixth arm 16 and the end effector. The force detecting section detects a force (including a translational force and a moment) applied to the end effector. The force detecting section is not particularly limited. For example, a six-axis force sensor capable of detecting force components (translational force components) in the respective axial directions of three axes orthogonal to one another and force components (rotational force components) around the respective three axes is used.

The robot 1 is a single-arm six-axis vertical articulated robot in which the base 4, the first arm 11, the second arm 12, the third arm 13, the fourth arm 14, the fifth arm 15, and the sixth arm 16 are coupled in this order from the proximal end side toward the distal end side. In the following explanation, the first arm 11, the second arm 12, the third arm 13, the fourth arm 14, the fifth arm 15, and the sixth arm 16 are respectively referred to as "arms" as well. The first driving source 401, the second driving source 402, the third driving source 403, the fourth driving source 404, the fifth driving source 405, and the sixth driving source 406 are respectively referred to as "driving sources" as well. Note that the lengths of the arms 11 to 16 are not respectively particularly limited and can be set as appropriate.

The base 4 and the first arm 11 are coupled via a joint 171. The first arm 11 has a first rotation axis O1 parallel to the vertical direction as a rotation center and is rotatable with respect to the base 4 around the first rotation axis O1. The first rotation axis O1 coincides with the normal of the upper surface of a floor 101, which is a setting surface of the base 4. The first rotation axis O1 is a rotation axis present on the most upstream side of the robot 1. The first arm 11 rotates according to driving of the first driving source 401 including a motor (a first motor) 401M and a reduction gear 6 (see FIG. 8). The motor 401M is controlled by the control board 81 via a motor driver 301 (a first motor driver) of the driving board 831 (a first driving board). Note that the reduction gear 6 may be omitted.

The first arm 11 and the second arm 12 are coupled via a joint 172. The second arm 12 has a second rotation axis O2 parallel to the horizontal direction as a rotation center and is rotatable with respect to the first arm 11 around the second rotation axis O2. The second arm 12 is cantilevered at the distal end portion of the first arm 11. Consequently, it is possible to achieve a reduction in the size and the weight of the robot 1. The second rotation axis O2 is parallel to an axis orthogonal to the first rotation axis O1. The second arm 12 rotates according to driving of the second driving source 402 including a motor (a second motor) 402M and a reduction gear (not shown in FIGS. 1 to 3). The motor 402M is controlled by the control board 81 via a motor driver 302 (a second motor driver) of the driving board 832 (a second driving board). Note that the reduction gear may be omitted. The second rotation axis O2 may be orthogonal to the first rotation axis O1.

The second arm 12 and the third arm 13 are coupled via a joint 173. The third arm 13 has a third rotation axis O3 parallel to the horizontal direction as a rotation center and is rotatable with respect to the second arm 12 around the third rotation axis O3. The third arm 13 cantilevered at the distal end portion of the second arm 12. Consequently, a reduction in the size and the weight of the robot 1 can be achieved. The third rotation axis O3 is parallel to the second rotation axis O2. The third arm 13 rotates according to driving of the third driving source 403 including a motor (a third motor) 403M and a reduction gear (not shown in FIGS. 1 to 3). The motor 403M is controlled by the control board 81 via a motor driver 303 (a third motor driver) of the driving board 833 (a third driving board). Note that the reduction gear may be omitted.

The third arm 13 and the fourth arm 14 are coupled via a joint 174. The fourth arm 14 has a fourth rotation axis O4 parallel to the center axis direction of the third arm 13 as a rotation center and is rotatable with respect to the third arm 13 around the fourth rotation axis O4. The fourth rotation axis O4 is orthogonal to the third rotation axis O3. The fourth arm 14 rotates according to driving of the fourth driving source 404 including a motor (a fourth motor) 404M and a reduction gear (not shown in FIGS. 1 to 3). The motor 404M is controlled by the control board 81 via a motor driver 304 (a fourth motor driver) of the driving board 834 (a fourth driving board). Note that the reduction gear may be omitted. The fourth rotation axis O4 may be parallel to an axis orthogonal to the third rotation axis O3.

The fourth arm 14 and the fifth arm 15 are coupled via a joint 175. The fifth arm 15 has a fifth rotation axis O5 as a rotation center and is rotatable with respect to the fourth arm 14 around the fifth rotation axis O5. The fifth arm 15 is cantilevered at the distal end portion of the fourth arm 14. Consequently, a reduction in the size and the weight of the robot 1 can be achieved. The fifth rotation axis O5 is orthogonal to the fourth rotation axis O4. The fifth arm 15 rotates according to driving of the fifth driving source 405 including a motor (a fifth motor) 405M and a reduction gear (not shown in FIGS. 1 to 3). The motor 405M is controlled by the control board 81 via a motor driver 305 (a fifth motor driver) of the driving board 835 (a fifth driving board). Note that the reduction gear may be omitted. The fifth rotation axis O5 may be parallel to an axis orthogonal to the fourth rotation axis O4.

The fifth arm 15 and the sixth arm 16 are coupled via a joint 176. The sixth arm 16 has a sixth rotation axis O6 as a rotation center and is rotatable with respect to the fifth arm 15 around the sixth rotation axis O6. The sixth rotation axis O6 is orthogonal to the fifth rotation axis O5. The sixth arm 16 rotates according to driving of the sixth driving source 406 including a motor (a sixth motor) 406M and a reduction gear (not shown in FIGS. 1 to 3). The motor 406M is controlled by the control board 81 via a motor driver 306 (a sixth motor driver) of the driving board 836 (a sixth driving board). Note that the reduction gear may be omitted. The sixth rotation axis O6 may be parallel to an axis orthogonal to the fifth rotation axis O5.

In the driving sources 401 to 406, a first angle sensor 411, a second angle sensor 412, a third angle sensor 413, a fourth angle sensor 414, a fifth angle sensor 415, and a sixth angle sensor 416 are provided in the respective motors or the respective reduction gears. In the following explanation, the first angle sensor 411, the second angle sensor 412, the third angle sensor 413, the fourth angle sensor 414, the fifth angle sensor 415, and the sixth angle sensor 416 are respectively referred to as "angle sensors" as well. The angle sensors are not particularly limited. For example, an encoder such as a rotary encoder can be used. Rotation (turning) angles of rotation axes (turning axes) of the motors or the reduction gears of the driving sources 401 to 406 are respectively detected by the angle sensors 411 to 416.

The motors of the driving sources 401 to 406 are not respectively particularly limited. For example, a servomotor such as an AC servomotor or a DC servomotor is desirable.

The reduction gears of the driving sources 401 to 406 are not respectively particularly limited. Examples of the reduction gears include a reduction gear of a so-called "planetary gear type" configured by a plurality of gears and a wave reduction gear (a wave gear device) called harmonic drive ("harmonic drive" is a registered trademark). The wave reduction gear is desirable.

The driving sources 401 to 406 and the angle sensors 411 to 416 are respectively electrically connected to the control board 81.

The control board 81 can operate the arms 11 to 16 independent from one another, that is, can control the driving sources 401 to 406 independently from one another via the motor drivers 301 to 306. In this case, the control board 81 performs detection with the force detecting section (not shown in FIGS. 1 to 3) and respectively controls driving of the driving sources 401 to 406, for example, angular velocities and rotation angles on the basis of a result of the detection (detection information). A control program for the control is stored in advance in a ROM or the like of the control board 81.

In this embodiment, the base 4 is a portion located in the bottom in the vertical direction of the robot 1 and fixed (set) to the floor 101 or the like of a setting space. A method of fixing the base 4 is not particularly limited. Examples of the method include a fixing method by a plurality of bolts. The floor 101 of a portion to which the base 4 is fixed is a plane (a surface) parallel to the horizontal plane. However, the floor 101 is not limited to this.

In work, the control board 81 of the robot 1 controls driving (operation) of the robot 1 with position control, force control, or the like on the basis of outputs of the angle sensors 411 to 416 and the force detecting section (not shown in FIGS. 1 to 3), that is, detection results (detected angles) of the angle sensors 411 to 416, a detection result (a detected force) of the force detecting section, and the like.

The position control is control of the operation of the robot 1 for moving the end effector to a target position in a target posture on the basis of information concerning the position and the posture of the end effector of the robot 1. Instead of the end effector, the distal end portion of the robot arm 10, an object grasped by the end effector, or the like may be used. The information concerning the position and the posture of the end effector can be calculated on the basis of, for example, the detection results of the angle sensors 411 and 416.

The force control is control of the operation of the robot 1 for, for example, changing the position and the posture of the end effector or pushing, pulling, or rotating the end effector on the basis of the detection result of the force detecting section. The force control includes, for example, impedance control and force trigger control.

In the force trigger control, the control board 81 performs detection with the force detecting section and moves (including a change of the posture), that is, operates the robot arm 10 until a predetermined force is detected by the force detecting section.

The impedance control includes tracer control. First, briefly explained, in the impedance control, the control board 81 controls the operation of the robot arm 10 (the robot 1) to maintain a force applied to the distal end portion of the robot arm 10 at a predetermined force as much as possible, that is, maintain a force in a predetermined direction detected by the force detecting section at a target value (including 0) as much as possible. Consequently, for example, when the impedance control is performed on the robot arm 10, an object (not shown in FIGS. 1 to 3) grasped by the end effector of the robot arm 10 moves following another object (not shown in FIGS. 1 to 3) in the predetermined direction.

The robot 1 is briefly explained above. The robot 1 is explained in detail below.

As shown in FIGS. 4 to 8, the base 4 is formed in a box shape and includes, on the inside, a housing space 42 in which an object can be housed (disposed). In this case, the entire internal space (inside) of the base 4 may be grasped as the housing space 42 or a part of the internal space (the inside) may be grasped as the housing space 42. The base 4 includes a main body section 43 and a lid body 44. The lid body 44 is detachably attached to a rear end face 431 (a surface on the negative side in the Y direction) of the main body section 43. In this embodiment, the lid body 44 is detachably attached to the main body section 43 by screwing. Note that a method of attaching the lid body 44 to the main body section 43 is not limited to the screwing. Examples of the method include fitting.

The robot 1 includes control boards 81 configured to control the driving of the robot body 2 and power supply boards 82 (see FIG. 10) configured to supply electric power to the control board 81.

The number of the control boards 81 is not particularly limited and is set as appropriate according to conditions. In this embodiment, the number of the control boards 81 is two. The two control boards 81 are disposed at a predetermined interval to overlap when viewed from the X direction and are electrically connected to each other. The control boards 81 may have the same configuration or may have different configurations. In this embodiment, the control boards 81 have functions different from each other. In the following explanation, one of the two control boards 81 is representatively explained. Note that the number of the control boards 81 may be one or may be three or more.

The number of the power supply boards 82 is not particularly limited and is set as appropriate according to conditions. In this embodiment, the number of the power supply boards 82 is two. The two power supply boards 82 are disposed in the Z direction at a predetermined interval and electrically connected to each other. The power supply boards 82 may have the same configuration or may have different configurations. In the following explanation, one of the two power supply boards 82 is representatively explained. Note that the number of the power supply boards 82 may be one or may be three or more.

The control board 81 includes a substrate on which wires are provided and a CPU (Central Processing Unit), which is an example of a processor, provided on the substrate, a RAM (Random Access Memory), and a ROM (Read Only Memory) in which computer programs are stored. In this embodiment, various computer programs are executed by the CPU, whereby functions of a control section configured to control driving of the robot body 2 are attained. Functions of a storing section configured to store various kinds of information (including data and computer programs) are attained by the RAM and the ROM.

The power supply board 82 includes a substrate on which wires are provided and a circuit provided on the substrate and configured to convert a voltage (electric power) supplied from the outside into a predetermined value (e.g., step down the voltage).

The driving board 831 is a circuit board configured to drive the motor 401M on the basis of a command of the control board 81. The driving board 831 includes a substrate on which wires are provided and the motor driver 301 provided on the substrate.

The driving board 832 is a circuit board configured to drive the motor 402M on the basis of a command of the control board 81. The driving board 832 includes a substrate on which wires are provided and the motor driver 302 provided on the substrate.

The driving board 833 is a circuit board configured to drive the motor 403M on the basis of a command of the control board 81. The driving board 833 includes a substrate on which wires are provided and the motor driver 303 provided on the substrate.

The driving board 834 is a circuit board configured to drive the motor 404M on the basis of a command of the control board 81. The driving board 834 includes a substrate on which wires are provided and the motor driver 304 provided on the substrate.

The driving board 835 is a circuit board configured to drive the motor 405M on the basis of a command of the control board 81. The driving board 835 includes a substrate on which wires are provided and the motor driver 305 provided on the substrate.

The driving board 836 is a circuit board configured to drive the motor 406M on the basis of a command of the control board 81. The driving board 836 includes a substrate on which wires are provided and the motor driver 306 provided on the substrate.

As shown in FIGS. 10 and 11, the control board 81 and the power supply board 82 are electrically connected (hereinafter simply referred to as "connected" as well) by a wire 921 (a second wire) and connected by a wire 922 (a second wire). The wire 921 is a power supply line used for delivering a voltage (electric power), which is input to the control board 81 from the outside, from the control board 81 to the power supply board 82. The wire 922 is a power supply line used to deliver a voltage, which is converted by the power supply board 82, (e.g., a stepped-down voltage) from the power supply board 82 to the control board 81. In this embodiment, the wires 921 and 922 are respectively provided as, for example, cables including tubes having insulation.

As shown in FIG. 12, the control board 81 and the driving board 831 are connected by a wire 91 (a first wire). The wire 91 is a power supply line used for delivering a voltage (a command) for driving the motor 401M from the control board 81 to the driving board 831. Similarly, the control board 81 and each of the driving boards 832 to 836 are connected by a wire (not shown in FIG. 12). In this embodiment, the wires connected to the wire 91 and the driving board 832 to 836 are respectively provided as, for example, cables including tubes having insulation.

As shown in FIGS. 4 to 6, the robot 1 includes a supporting member 5 configured to respectively attachably and detachably support the control board 81 and the power supply board 82. The supporting member 5 is provided in the housing space 42 attachably to and detachably from the base 4. Consequently, the control board 81 and the power supply board 82 are respectively provided in the housing space 42. In this embodiment, the supporting member 5 is detachably attached to the base 4 by screwing. Note that a method of attaching the supporting member 5 to the base 4 is not limited to the screwing. Examples of the method include fitting.

In this way, as the robot 1 and the control board 81 and the power supply board 82 (a control device) are integrated, a reduction in the size of the robot 1 (a reduction in the size of the entire robot system) can be achieved. Because the supporting member 5 is detachably attachable to the base 4, assembly (manufacturing) of the robot 1, maintenance of the control board 81 and the power supply board 82, and the like can be easily and quickly performed. Note that the supporting member 5 may have other structures. The supporting member 5 may not be detachable from the base 4.

The entire shape of the supporting member 5 is formed in a tabular shape. That is, the supporting member 5 includes a main substrate 51 (a tabular section) formed in a tabular shape. The shape of the main substrate 51 is not particularly limited. However, in this embodiment, the main substrate 51 is a rectangle (a square) in a plan view of the main substrate 51. Note that examples of the shape of the main substrate 51 include, besides the square, polygons such as a triangle, a pentagon, and a hexagon, a circle, and an ellipse.

A rear substrate 52 is provided in a rear part (the negative side in the Y direction) of the main substrate 51. The rear substrate 52 is disposed to be perpendicular to the main substrate 51. In this embodiment, the main substrate 51 and the rear substrate 52 are formed by bending one substrate. However, the main substrate 51 and the rear substrate 52 are not limited to this and, for example, may be formed by separate members.

The rear substrate 52 is a member screwed to the base 4. Two through-holes 521 are formed in the rear substrate 52.

Two ribs 45 are formed on one sidewall 41 (on the positive side in the X direction) in the housing space 42 of the main body section 43 of the base 4. The ribs 45 respectively extend in the Y direction. The ribs 45 are disposed side by side in the Z direction at a predetermined interval.

In the ribs 45, female screws 451 are respectively formed on ends faces on the negative side in the Y direction. Two male screws (not shown in FIG. 7) are respectively inserted through the through-holes 521 corresponding to the male screws and screwed in the female screws 451 of the ribs 45 corresponding to the male screws, whereby the supporting member 5 is detachably attached to the base 4. Note that the supporting member 5 may be detachably attached to not only the main body section 43 but also the lid body 44.

The supporting member 5 is disposed such that the main substrate 51 extends along the axial direction of the first rotation axis O1 (the vertical direction). In this embodiment, the supporting member 5 is disposed such that the main substrate 51 and the Z axis (the vertical line) are parallel, specifically, a short side 512 of the main substrate 51 and the Z axis are parallel and a long side 511 of the main substrate 51 and the Y axis are parallel. Consequently, the control board 81 and the power supply board 82 can be disposed along the vertical direction. Accordingly, dust and the like are prevented from accumulating on the control board 81 and the power supply board 82.

Note that the supporting member 5 may be disposed in other postures, for example, a posture in which the main substrate 51 is inclined with respect to the vertical direction and a posture in which the main substrate 51 and the X-Y plane (the horizontal plane) are parallel.

As shown in FIGS. 7 and 9, the base 4 includes a posture restricting section 47 configured to restrict the posture of the supporting member 5 attached to (provided in) the housing space 42. In this embodiment, the posture restricting section 47 is configured by a rib formed on a front wall 46 in the housing space 42 of the main body section 43.

The posture restricting section 47 is disposed in an upper part (on the positive side in the Z direction) of the housing space 42 and extends in the X direction. The posture restricting section 47 includes a groove 471 into which the distal end portion of the main substrate 51 of the supporting member 5 is inserted. The groove 471 extends in the Z direction and is opened to the negative side in the Y direction and the negative side in the Z direction. Therefore, the posture restricting section 47 supports the distal end portion of the main substrate 51 of the supporting member 5 from the positive side and the negative side in the X direction, the positive side in the Y direction, and the positive side in the Z direction to thereby restrict the posture of the supporting member 5. Consequently, the posture of the supporting member 5 can be stabilized. When the supporting member 5 is attached to the base 4, the supporting member 5 is inserted into the groove 471, whereby the posture of the supporting member 5 is stabilized. Attachment work of the supporting member 5 can be easily and quickly performed. Note that the groove 471 may be bottomless, that is, may be opened to the positive side in the Y direction or may be opened to the positive side in the Z direction.

A constituent material of the supporting member 5 is not particularly limited. However, a metal material (including an alloy) is desirable. A material having high thermal conductivity such as aluminum or an aluminum alloy is more desirably used. By using the material having the high thermal conductivity, heat generated in the control board 81 and the power supply board 82 can be efficiently allowed to escape from the supporting member 5 to the base 4.

In this embodiment, the control board 81 and the power supply board 82 are respectively detachably attached to the main substrate 51 of the supporting member 5 by screwing. The control board 81 is attached to one surface of the main substrate 51. The power supply board 82 is attached to the other surface of the main substrate 51. Note that a method of respectively attaching the control board 81 and the power supply board 82 to the supporting member 5 is not limited to the screwing.

The supporting member 5 is configured to be capable of supporting the control board 81 in a first position (a position where through-holes 811 of the control board 81 and female screws 513 of a first female screw group 5130 of the supporting member 5 corresponding to the through-holes 811 coincide) shown in FIGS. 4 and 9 and a second position (a position where the through-holes 811 of the control board 81 and female screws 514 of a second female screw group 5140 of the supporting member 5 corresponding to the through-holes 811 coincide) different from the first position. That is, the position (the supporting position) of the control board 81 in the supporting member 5 can be changed to the first position and the second position. In this embodiment, the first position is located further on the negative side in the Y direction than the second position. Consequently, the control board 81 can be disposed in either the first position or the second position (the position of the control board 81 in the base 4 can be changed) according to a purpose, a use, or the like. When the position of the control board 81 in the base 4 is changed, compared with when the position of the supporting member 5 with respect to the base 4 is changed, because the position of the control board 81 with respect to the supporting member 5 is changed, work can be easily and quickly performed.

Specifically, as shown in FIG. 5, the first female screw group 5130 configured by a plurality of female screws 513 and the second female screw groups 5140 configured by a plurality of female screws 514 are formed in the main substrate 51 of the supporting member 5.

The disposition of the female screws 513 in the first female screw group 5130 and the disposition of the female screws 514 in the second female screw group 5140 are the same. The first female screw group 5130 is located further on the negative side in the Y direction than the second female screw group 5140.

On the other hand, as shown in FIGS. 4 and 9, in the control board 81, a through-hole group 8110 configured by a plurality of through-holes 811 that can be selectively disposed in one of the positions of the female screws 513 and the positions of the female screws 514 is formed.

When the control board 81 is attached to the first position of the supporting member 5, the through-holes 811 of the control board 81 and the female screws 513 of the first female screw group 5130 of the supporting member 5 corresponding to the through-holes 811 are aligned. A plurality of male screws (not shown in FIGS. 4 and 9) are respectively inserted into the through-holes 811 corresponding to the male screws and screwed in the female screws 513 corresponding to the male screws. When the control board 81 is disposed in the first position, a connector of the control board 81 projects to the outside from an opening of the lid body 44 of the base 4.

When the control board 81 is attached to the second position of the supporting member 5, the through-holes 811 of the control board 81 and the female screws 514 of the second female screw group 5140 of the supporting member 5 corresponding to the through-holes 811 are aligned. A plurality of male screws (not shown in FIGS. 4 and 9) are respectively inserted into the through-holes 811 corresponding to the male screws and screwed in the female screws 514 corresponding to the male screws. When the control board 81 is disposed in the second position, the connector of the control board 81 is disposed in the housing space 42 of the base 4.

A specific use example is explained. When the control board 81 is disposed in the first position, the robot 1 is normally used.

When the control board 81 is disposed in the second position, a waterproof connector is electrically connected to the connector of the control board 81 via a wire. The waterproof connector is projected to the outside from the opening of the lid body 44 of the base 4. A sealing member (not shown in FIGS. 4 and 9) is provided in a necessary part such as a part between the main body section 43 of the base 4 and the lid body 44 to liquid-tightly seal the housing space 42. A sealing member (not shown in FIGS. 4 and 9) is provided in another necessary part of the robot 1 to liquid-tightly seal a portion corresponding to the necessary part. Consequently, for example, the robot 1 having a waterproof function can be realized.

Note that positions of the control board 81 with respect to the supporting member 5 is not limited to the first position and the second position and may be changeable to, for example, three or more positions. The positions of the control board 81 with respect to the supporting member 5 may be unchangeable.

As explained above, the first arm 11 has the first rotation axis O1 as the rotation center and is rotatable with respect to the base 4 around the first rotation axis O1.

As shown in FIG. 8, the first driving source 401 configured to rotate the first arm 11 includes the motor 401M, the reduction gear 6, a pulley 72 (a driving pulley), a pulley 73 (a driven pulley), and a belt 71 (a timing belt) configured to transmit a driving force of the motor 401M to the base 4 via the reduction gear 6.

The pulley 72 is coupled (connected) to a rotating shaft (an output shaft) of the motor 401M. The pulley 73 is coupled to an input shaft of the reduction gear 6. The belt 71 is an endless belt and is laid over the pulley 72 and the pulley 73. An output shaft of the reduction gear 6 is coupled to the base 4. The driving force (rotation) of the motor 401M is transmitted to the reduction gear 6 by the pulleys 72 and 73 and the belt 71. Rotating speed of the motor 401M is reduced by the reduction gear 6 and transmitted to the base 4.

In this way, the first driving source 401 includes the belt 71 configured to transmit the driving force of the motor 401M. Therefore, the motor 401M can be disposed in a position separated from a joint that couples the base 4 and the first arm 11. Consequently, the motor 401M can be disposed in a desired position of the first arm 11.

The first driving source 401 is provided on the inside of the first arm 11. Specifically, the first motor 401M, the belt 71, the pulleys 72 and 73, and a part of the reduction gear 6 of the first driving source 401 are provided on the inside of the first arm 11. Consequently, compared with when the first driving source 401, which is a heat source, is provided in the housing space 42 of the base 4, the temperature of the housing space 42 can be reduced. Accordingly, influence by the heat of the control board 81 can be reduced. Note that, in the first driving source 401, the first motor 401M only has to be provided in the first arm 11. The entire or a part of each of the belt 71, the pulleys 72 and 73, and the reduction gear 6 may be provided in, for example, the housing space 42 of the base 4.

The first motor 401M does not overlap the first rotation axis O1 when viewed from the axial direction of the first rotation axis O1. That is, the first motor 401M is offset with respect to the first rotation axis O1. Consequently, because the first motor 401M is separated from the base 4 when viewed from the axial direction of the first rotation axis O1, heat generated in the first motor 401M is less easily transmitted to the control board 81. Accordingly, the influence by the heat of the control board 81 can be reduced.

The driving board 831 is provided on the inside of the first arm 11. In this embodiment, the driving board 831 is attached to a housing of the motor 401M. Consequently, compared with when the driving board 831, which is a heat source, is provided in the housing space 42 of the base 4, the temperature of the housing space 42 can be reduced. Accordingly, the influence by the heat of the control board 81 can be reduced.

A voltage supplied to the first motor 401M is not particularly limited. However, the voltage supplied to the first motor 401M is desirably 1 V or more and 100 V or less, more desirably 10 V or more and 100 V or less, and still more desirably 50 V or more and 60 V or less. Consequently, the first motor 401M and the power supply board 82 can be reduced in size. Accordingly, a reduction in the size of the robot 1 can be achieved.

As shown in FIG. 1, the driving sources 402 to 406 and the driving boards 832 to 836 (see FIG. 3) are respectively provided on the insides of predetermined arms of the robot arm 10. Consequently, compared with when the driving boards 832 to 836, which are heat sources, are provided in the housing space 42 of the base 4, the temperature of the housing space 42 can be reduced. Accordingly, the influence by the heat of the control board 81 can be reduced. In this embodiment, the second motor 402M and the third motor 403M are provided on the inside of the second arm 12. The fourth motor 404M is provided on the inside of the third arm 13. The fifth motor 405M and the sixth motor 406M are provided on the inside of the fourth arm 14. Note that the second motor 402M to the sixth motor 406M may be respectively disposed in other positions. In this embodiment, the driving board 832 is provided on the inside of the second arm 12.

Voltages supplied to the motors 402M to 406M are not respectively particularly limited. However, the voltages supplied to the motors 402M to 406M are desirably 1 V or more and 100 V or less, more desirably 10 V or more and 100 V or less, and still more desirably 50 V or more and 60 V or less. Consequently, the motors 402M to 406M and the power supply board 82 can be reduced in size. Accordingly, a reduction in the size of the robot 1 can be achieved.

A cooling device such as a fan is not provided in the base 4. Consequently, the number of components can be reduced. The configuration of the base 4 can be simplified. The base 4 can be reduced in size. Accordingly, a reduction in the size of the robot 1 can be achieved. Note that, in the robot 1, as explained above, because the first driving source 401 and the driving boards 831 to 836 are not provided in the housing space 42, the temperature of the housing space 42 can be reduced. Therefore, no problem occurs even if the cooling device such as the fan is not provided in the base 4.

Note that the driving board 831 may be provided not only in the first arm 11 and but also in, for example, the base 4. A part or all of the driving boards 832 to 836 may be provided not only in the robot arm 10 but also in, for example, the base 4. The cooling device such as the fan may be provided in the base 4.

As shown in FIG. 12, in the wire 91, an excess length longer than a distance L1 (see FIG. 13) between the supporting member 5 in a state in which the supporting member 5 is provided in the base 4 and the supporting member 5 in a state in which the supporting member 5 is removed from the base 4 is provided with respect to a length without play. The excess length of the wire 91 is not particularly limited and is set as appropriate according to conditions. However, the excess length of the wire 91 is desirably 1.2 times or more of the distance L1, more desirably 1.5 times or more of the distance L1, and still more desirably twice or more and three times or less of the distance L1. Consequently, the supporting member 5 can be easily and quickly attached to and detached from the base 4. The state in which the supporting member 5 is removed from the base 4 refers to a state in which, as shown in FIG. 13, the supporting member 5 is located in the position of the lid body 44 attached to the rear end face 431 of the main body section 43 of the base 4.

As shown in FIGS. 10 and 11, in the wires 921 and 922, excess lengths longer than a distance L2 between the first position and the second position (a center-to-center distance between the female screw 513 and the female screw 514 corresponding to the female screw 513) (see FIG. 13) are respectively provided with respect to lengths without play. The excess lengths of the wires 921 and 922 are respectively not particularly limited and are set as appropriate according to conditions. However, the excess lengths of the wires 921 and 922 are desirably 1.2 times or more of the distance L2, more desirably 1.5 times or more of the distance L2, and still more desirably twice or more and three times or less of the distance L2. Consequently, the position of the control board 81 can be easily and quickly changed from one to the other of the first position and the second position. Note that the excess length of the wire 921 and the excess length of the wire 922 may be the same or may be different.

As explained above, with the robot 1, because the robot 1 and the control board 81 and the power supply board 82 (the control device) are integrated, a reduction in the size of the robot 1 (a reduction in the size of the entire robot system) can be achieved.

The first motor 401M of the first driving source 401 is provided not only in the housing space 42 of the base 4 but also in the first arm 11. Therefore, maintenance and the like of the first motor 401M can be easily and quickly performed. Compared with when the first motor 401M, which is a heat source, is provided in the housing space 42 of the base 4, the temperature of the housing space 42 can be reduced. Consequently, the influence by the heat of the control board 81 can be reduced.

As explained above, the robot 1 includes the base 4, the robot arm 10 provided on the base 4, the control board 81 provided in the housing space 42 (the inside) of the base 4 and configured to control the driving of the robot body 2 (the robot arm 10), and the power supply board 82 provided in the housing space 42 (the inside) of the base 4 and configured to supply electric power to the control board 81. The robot arm 10 includes the first arm 11 provided on the base 4 rotatably around the first rotation axis O1. The first motor 401M configured to rotate the first arm 11 is provided in the first arm 11.

With such a robot 1, because the robot 1 and the control board 81 and the power supply board 82 (the control device) are integrated, a reduction in the size of the robot 1 can be achieved.

The first motor 401M is provided in the first arm 11 rather than in the housing space 42 of the base 4. Therefore, maintenance and the like of the first motor 401M can be easily and quickly performed. Compared with when the first motor 401M, which is a heat source, is provided in the housing space 42 of the base 4, the temperature of the housing space 42 can be reduced. Consequently, the influence by the heat of the control board 81 can be reduced.

The robot 1 includes the first driving board 831 configured to drive the first motor 401M on the basis of a command of the control board 81. The first driving board 831 is provided in the first arm 11. Consequently, compared with when the first driving board 831, which is a heat source, is provided in the housing space 42 of the base 4, the temperature of the housing space 42 can be reduced. Accordingly, the influence of the heat of the control board 81 can be reduced.

The voltage supplied to the first motor 401M is 1 V or more and 100 V or less. Consequently, the first motor 401M and the power supply board 82 can be reduced in size. Consequently, a reduction in the size of the robot 1 can be achieved.

The robot 1 incudes the belt 71 configured to transmit the driving force of the first motor 401M. Consequently, the first motor 401M can be disposed in a position separated from the joint that couples the base 4 and the first arm 11. Accordingly, the first motor 401M can be disposed in a desired position of the first arm 11.

The first motor 401M does not overlap the first rotation axis O1 when viewed from the axial direction of the first rotation axis O1. Consequently, because the first motor 401M is separated from the base 4, heat generated in the first motor 401M is less easily transmitted to the control board 81.

The robot arm 10 includes the second arm 12 provided in the first arm 11 rotatably around the second rotation axis. The second motor 402M configured to rotate the second arm 12 is provided in the second arm 12. Consequently, the first motor 401M and the second motor 402M, which are heat sources, are distributed to the first arm 11 and the second arm 12. Compared with when the first motor 401M and the second motor 402M are not distributed, the temperatures of the first arm 11 and the second arm 12 can be reduced.

The robot 1 includes the second driving board 832 configured to drive the second motor 402M on the basis of a command of the control board 81. The second driving board 832 is provided in the second arm 12. Consequently, the first driving board 831 and the second driving board 832, which are heat sources, are distributed to the first arm 11 and the second arm 12. Compared with when the first driving board 831 and the second riving board 832 are not distributed, the temperatures of the first arm 11 and the second arm 12 can be reduced.

A fan is desirably not provided in the base 4. Consequently, the number of components can be reduced. The configuration of the base 4 can be simplified. The base 4 can be reduced in size. Accordingly, a reduction in the size of the robot 1 can be achieved.

The robot according to the embodiment is explained above with reference to the drawings. However, the invention is not limited to the embodiment. The components of the sections can be replaced with any components having the same functions. Any other components may be added.

In the embodiment, the fixing part of the base of the robot is, for example, the floor in the setting space. However, in the invention, the fixing part of the base of the robot is not limited to this. Examples of the fixing part include, besides the floor, a ceiling, a wall, a workbench, and the ground. The base itself may be movable.

In the invention, the robot may be set in a cell. In this case, examples of the fixing part of the base of the robot include a floor section, a ceiling section, a wall section, and a workbench of the cell.

In the embodiment, the first surface, which the plane (the surface) to which the robot (the base) is fixed, is the plane (the surface) parallel to the horizontal plane. However, in the invention, the first surface is not limited to this. The first surface may be, for example, a plane (a surface) inclined with respect to the horizontal plane or the vertical plane or may be a plane (a surface) parallel to the vertical plane. That is, the first rotation axis may be inclined with respect to the vertical direction or the horizontal direction, may be parallel to the horizontal direction, or may be parallel to the vertical direction.

In the embodiment, the number of the rotation axes of the robot arm is six. However, in the invention, the number of the rotation axes of the robot arm is not limited to this. The number of the rotation axes of the robot arm may be, for example, one, two, three, four, five, or seven or more. That is, in the embodiment, the number of the arms (the links) is six. However, in the invention, the number of the arms (the links) is not limited to this. The number of the arms (the links) may be, for example, one, two, three, four, five, or seven or more. In this case, for example, in the robot in the embodiment, by adding an arm between the second arm and the third arm, a robot including seven arms can be realized.

In the embodiment, the number of the robot arms is one. However, in the invention, the number of the robot arms is not limited to this. The number of the robot arms may be, for example, two or more. That is, the robot (the robot body) may be a plural arm robot such as a double arm robot.

In the invention, the robot may be a robot of another form. Specific examples of the robot include a leg-type walking (running) robot including leg sections and a horizontal articulated robot such as a SCARA robot.

The entire disclosure of Japanese Patent Application No. 2017-192075, filed Sep. 29, 2017, is expressly incorporated by reference herein.

What is claimed is:

1. A robot comprising:
    a base having a housing defining an internal space;
    a first robot arm including a first arm rotatably connected to the base and rotating around a first rotation axis, the first arm having a housing defining an internal space;
    a first motor provided in the internal space of the first arm and selectively rotating the first arm;
    a control board provided in the internal space of the base and controlling driving of the robot arm;
    a power supply board provided in the internal space of the base and supplying electric power to the control board; and
    a support plate disposed in the internal space of the base and fixed to the housing of the base, the support plate supporting the control board on a first surface of the support plate and supporting the power supply board on a second surface of the support plate, the second surface being opposite the first surface,
    wherein the support plate is vertically positioned inside of the base, and
    the support plate is in contact with the housing of the base and is configured to provide a flow channel for heat produced by the power supply board and the control board away from the power supply board and the control board to the housing of the base.

2. The robot according to claim 1, further comprising a first driving board provided in the first arm and configured to drive the first motor on the basis of a command of the control board.

3. The robot according to claim 1, wherein a voltage supplied to the first motor is 1 V or more and 100 V or less.

4. The robot according to claim 1, further comprising a belt configured to transmit a driving force of the first motor to the base.

5. The robot according to claim 4, wherein an output shaft of the first motor is offset with respect to the first rotation axis when viewed from an axial direction of the first rotation axis.

6. The robot according to claim 1, further comprising a second arm provided on the first arm and rotating around a second rotation axis, wherein
a second motor configured to rotate the second arm is provided in the second arm.

7. The robot according to claim 6, further comprising a second driving board configured to drive the second motor on the basis of a command of the control board, wherein
the second driving board is provided in the second arm.

8. The robot according to claim 1, wherein a fan is not provided in the base.

* * * * *